United States Patent
Tomisawa et al.

(10) Patent No.: US 7,260,036 B2
(45) Date of Patent: Aug. 21, 2007

(54) DATA PROCESSOR USED IN A PLURALITY OF OPTICAL DISK RECORDING MEDIUMS

(75) Inventors: Shin-ichiro Tomisawa, Gifu-ken (JP); Satoshi Noro, Gifu-ken (JP); Toshiyuki Shutoku, Aichi-ken (JP); Hiroki Nagai, Gifu-ken (JP); Takuya Shiraishi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 511 days.

(21) Appl. No.: 10/389,453

(22) Filed: Mar. 14, 2003

(65) Prior Publication Data

US 2003/0174607 A1    Sep. 18, 2003

(30) Foreign Application Priority Data

Mar. 15, 2002    (JP)    ............... 2002-071324

(51) Int. Cl.
G11B 7/0045    (2006.01)
(52) U.S. Cl. ............... 369/47.24; 369/59.13; 369/53.22
(58) Field of Classification Search ............. 369/47.24, 369/53.22, 47.22, 47.19, 53.13
See application file for complete search history.

(56) References Cited

U.S. PATENT DOCUMENTS

| | | | |
|---|---|---|---|
| 6,324,128 B1* | 11/2001 | Ikeda et al. ............... | 369/13.05 |
| 6,414,932 B1 | 7/2002 | Kaku et al. | |
| 6,510,115 B2* | 1/2003 | Furuichi et al. ......... | 369/53.22 |
| 6,654,328 B2 | 11/2003 | Kaku et al. | |
| 6,721,261 B2 | 4/2004 | Kaku et al. | |
| 2002/0012303 A1 | 1/2002 | Furuichi et al. | |
| 2002/0067671 A1* | 6/2002 | Park .......................... | 369/53.2 |
| 2002/0080702 A1 | 6/2002 | Asada et al. | |
| 2003/0223331 A1* | 12/2003 | Shiraishi et al. .......... | 369/47.22 |

FOREIGN PATENT DOCUMENTS

| | | |
|---|---|---|
| JP | 9-293321 | 11/1997 |
| JP | 2000-298939 | 10/2000 |
| JP | 2001-43531 | 2/2001 |
| JP | 2001-222817 | 8/2001 |
| JP | 1 178 482 | 2/2002 |
| JP | 2002-245620 | 8/2002 |
| JP | 2005-038131 | 6/2005 |

\* cited by examiner

*Primary Examiner*—Wayne Young
*Assistant Examiner*—Michael V. Battaglia
(74) *Attorney, Agent, or Firm*—Occhiuti Rohlicek & Tsao, LLP

(57) ABSTRACT

A data processor compatible for use with a CD and a DVD includes a first modulation circuit for modulating recording data for recording on a CD to generate first modulated data. A second modulation circuit modulates recording data for recording on a DVD to generate second modulated data. A write signal generation circuit generates a first write signal, which is written to the CD, from the first modulated data, and a second write signal, which is written to the DVD, from the second modulated data. The write signal generation circuit is commonly used for the CD and the DVD to reduce the circuit area of the data processor.

12 Claims, 3 Drawing Sheets

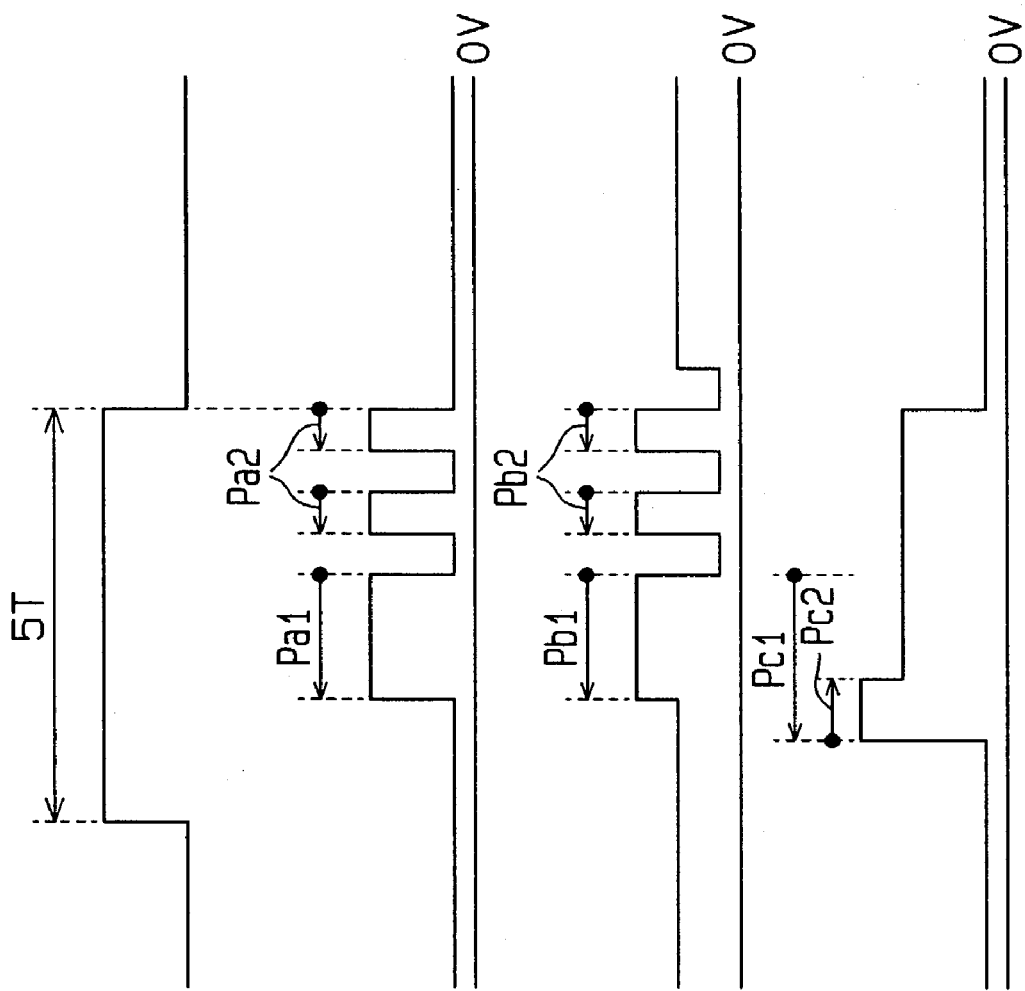

DATA PROCESSOR USED IN A PLURALITY OF OPTICAL DISK RECORDING MEDIUMS

CROSS-REFERENCE TO RELATED APPLICATIONS

This application is based upon and claims the benefit of priority from the prior Japanese Patent Application No. 2002-071324, filed on Mar. 15, 2002, the entire contents of which are incorporated herein by reference.

BACKGROUND OF THE INVENTION

The present invention relates to a data processor, and more particularly, to a data processor used in a recording-reproducing device for a compact disc (CD) or a digital versatile disc (DVD) to perform modulation or demodulation.

An optical disc, such as a CD or a DVD, is used as a recording medium that stores a large amount of data. The CD includes a compact disc read only memory (CD-ROM), a compact disc-recordable (CD-R), and a compact disc-rewritable (CDRW). The DVD includes a digital versatile disc read only memory (DVD-ROM), a digital versatile disc-recordable (DVD-R), and a digital versatile disc-rewritable (DVD-RW).

In recent years, a recording-reproducing device compatibly used for a CD-ROM, a CD-R, a CD-RW, and a DVD-ROM has been proposed. To achieve miniaturization, such a recording-reproducing device includes a single-chip large scale integration (LSI) circuit provided with the function of a CD decoder and the function of a DVD decoder. Further, to manufacture a compact recording-reproducing device for a data writable DVD (DVD-R, DVD-RW), an LSI provided with the function of a DVD encoder is being developed.

A writable CD, such as a CD-R or a CD-RW, has a track including grooves formed in lands of the disc. The grooves are slightly wobbled in the radial direction of the CD. Information referred to as absolute time in pregroove (ATIP) is written to the grooves in accordance with the cyclic wobble changes. In a CD-R or CD-RW, the track is traced to read the ATIP information written to the grooves and obtain the absolute time information of the present track position. The absolute time information indicates a position on the disc and is used as address information for designating a write position of the recording medium. The recording-reproducing device uses a laser pickup to detect the wobble cycle and generate a wobble signal.

In a writable DVD, such as a DVD-R or a DVD-RW, areas storing address information, which is referred to as a land prepit (LPP), is provided at predetermined intervals in a track. Unlike the absolute time information of track positions in a CD, the address information of the LPP is obtained from consecutive numbers applied to each sector. The recording-reproducing device uses a laser pickup to detect the position of the LPP and generate a LPP signal.

As described above, a CD and a DVD record address information, which indicates write positions, in a different manner. Further, a CD and a DVD use different data recording formats and perform modulation in different manners. Therefore, in the prior art, the recording-reproducing device includes a data processing circuit for recording data on a CD and a separate data processing circuit for recording data on a DVD. These circuits are arranged parallel to each other and increase the circuit scale of the LSI.

SUMMARY OF THE INVENTION

In a first aspect of the present invention, there is provided a data processor compatible for use with a first optical disc recording medium and a second optical disc recording medium. The first optical disc recording medium records first position information corresponding to a first recording format. The second optical disc recording medium records second position information corresponding to a second recording format. The data processor includes a first timing generation circuit which generates a first timing signal based on first position information read from the first optical disc recording medium. A second timing generation circuit generates a second timing signal based on second position information read from the second optical disc recording medium. A first modulation circuit is connected to the first timing generation circuit to perform a first modulation process on recording data for recording on the first optical disc recording medium in accordance with the first timing signal and generates first modulated data. A second modulation circuit is connected to the second timing generation circuit to perform a second modulation process on the recording data for recording on the second optical disc recording medium in accordance with the second timing signal and generates second modulated data. A write signal generation circuit is connected to the first and second modulation circuits to generate a first write signal, which is written to the first optical disc recording medium, from the first modulated data, and a second write signal, which is written to the second optical disc recording medium, from the second modulated data.

In a second aspect of the present invention, there is provided a data processor compatible for use with a first optical disc recording medium and a second optical disc recording medium. The first optical disc recording medium records first position information corresponding to a first recording format. The second optical disc recording medium records second position information corresponding to a second recording format. The data processor includes a first timing generation circuit which generates a first timing signal based on first position information read from the first optical disc recording medium, and a second timing generation circuit which generates a second timing signal based on second position information read from the second optical disc recording medium. A first modulation circuit is connected to the first timing generation circuit to perform a first modulation process on recording data for recording on the first optical disc recording medium in accordance with the first timing signal and generates first modulated data. A second modulation circuit is connected to the second timing generation circuit to perform a second modulation process on the recording data for recording on the second optical disc recording medium in accordance with the second timing signal and generates second modulated data. The first and second modulation circuits are selectively activated in response to a distinguishing signal indicating the type of optical disc recording medium. A write signal generation circuit is connected to the first and second modulation circuits which generates a first write signal, which is written to the first optical disc recording medium, from the first modulated data, and a second write signal, which is written to the second optical disc recording medium, from the second modulated data. The write signal generation circuit includes a register for storing one of a first data table corresponding to the first optical disc recording medium, and a second data table corresponding to the second optical disc recording medium, and a pulse generation circuit connected to the register which generates from data of the data table stored in the register one of a first pulse signal corresponding to the first write signal, and a second pulse signal corresponding to the second write signal.

In a third aspect of the present invention, there is provided a data processor compatible for use with a first optical disc recording medium and a second optical disc recording medium. The first optical disc recording medium records first position information corresponding to a first recording format. The second optical disc recording medium records second position information corresponding to a second recording format. The data processor includes a first timing generation circuit which generates a first timing signal based on first position information read from the first optical disc recording medium, and a second timing generation circuit which generates a second timing signal based on second position information read from the second optical disc recording medium. A first modulation circuit is connected to the first timing generation circuit to perform a first modulation process on recording data for recording on the first optical disc recording medium in accordance with the first timing signal and generates first modulated data. A second modulation circuit is connected to the second timing generation circuit to perform a second modulation process on the recording data for recording on the second optical disc recording medium in accordance with the second timing signal and generates second modulated data. The first and second modulation circuits are selectively activated in response to a distinguishing signal indicating the type of optical disc recording medium. A write signal generation circuit is connected to the first and second modulation circuits to generate a first write signal, which is written to the first optical disc recording medium, from the first modulated data, and a second write signal, which is written to the second optical disc recording medium, from the second modulated data. The write signal generation circuit includes a register for storing one of a first data table corresponding to the first optical disc recording medium, and a second data table corresponding to the second optical disc recording medium, and a pulse generation circuit connected to the register which generates from data of the data table stored in the register one of a first pulse signal corresponding to the first write signal, and a second pulse signal corresponding to the second write signal. A read channel circuit generates first reproduced data based on a first read signal from the first optical disc recording medium and generates second reproduced data based on a second read signal from the second optical disc recording medium. A first demodulation circuit is connected to the read channel circuit to perform a first demodulation on the first reproduced data and generates first demodulated data. A second demodulation circuit is connected to the read channel circuit to perform a second demodulation on the second reproduced data and generates second demodulated data. The read channel circuit generates a read clock signal from one of the first read signal and the second read signal. The first demodulation circuit generates the first demodulated data in accordance with the read clock signal. The second demodulation circuit generates the second demodulated data in accordance with the read clock signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a waveform chart illustrating recording data; and

FIGS. 3B to 3D are waveform charts illustrating pulse signals corresponding to the recording data of FIG. 3A.

DETAILED DESCRIPTION OF THE PREFERRED EMBODIMENTS

Figure 1:
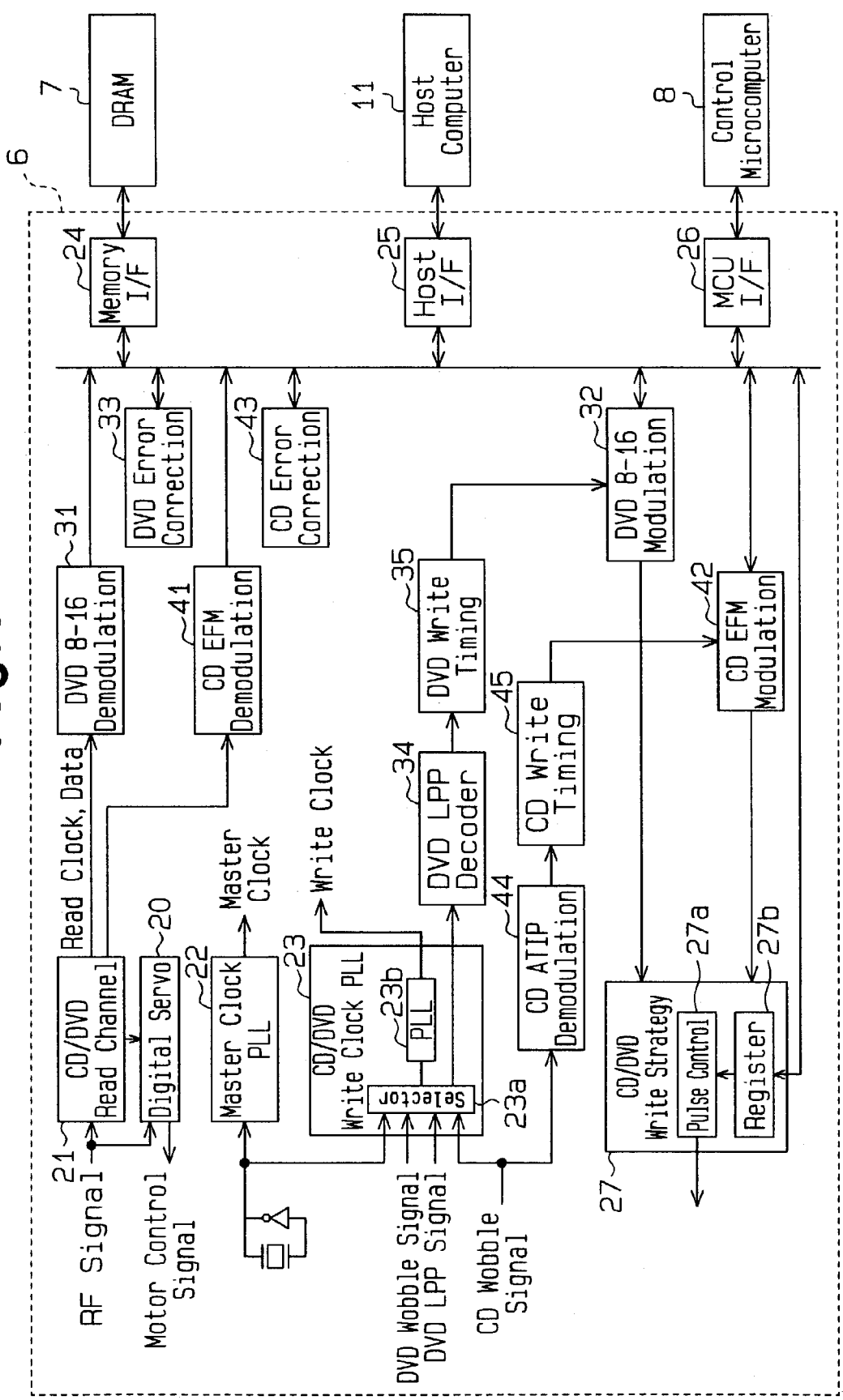
FIG. 1 is a schematic block diagram illustrating a data processor according to a preferred embodiment of the present invention.

In the drawings, like numerals are used for like elements throughout.

Figure 2:
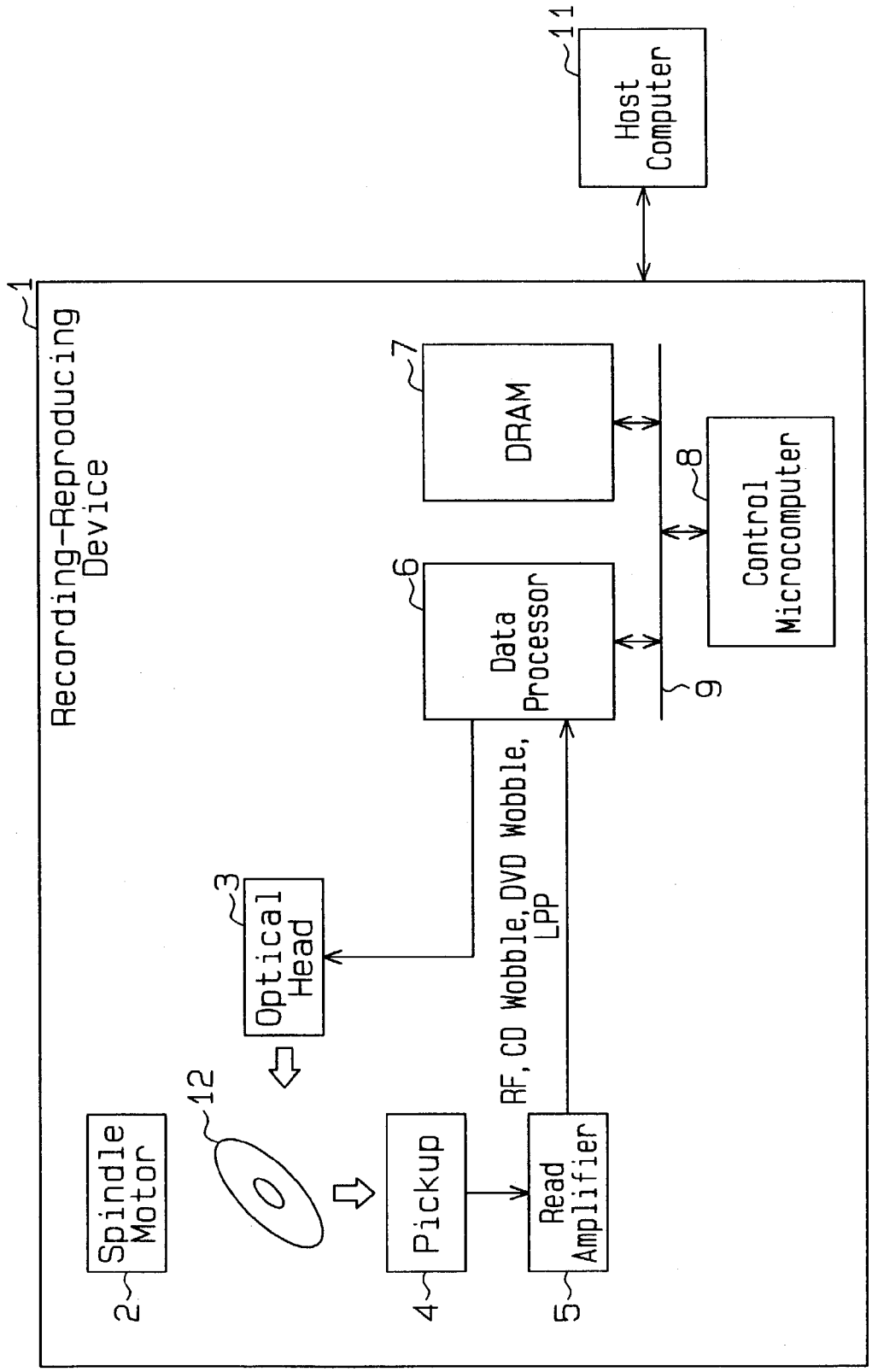
FIG. 2 is a schematic block diagram of a recording-reproducing device incorporating the data processor of FIG. 1.

Referring to FIG. 2, a recording-reproducing device 1, which enables the use of a CD and a DVD, is connected to a host computer 11. The recording-reproducing device 1 records data, which is provided from a host computer 11, on an optical disc (CD or DVD) 12 and provides data read from the optical disc 12 to the host computer 11.

The recording-reproduction device 1 includes a spindle motor 2, an optical head 3, a pickup 4, a read amplifier 5, a data processor 6 according to a preferred embodiment of the present invention, a dynamic random access memory (DRAM) 7 and a control microcomputer 8. The data processor 6, the DRAM 7, and the control microcomputer 8 are connected by a bus 9 to transfer data between one another.

When recording data, the spindle motor 2 rotates the optical disc 12, and the optical head 3 irradiates a recording layer of the optical disc 12 with a laser beam in accordance with the recording data. The optical head 3 emits a high power laser beam to form a recording pit. The recording pit is not formed when the optical head 3 emits a low power laser beam. The recording pit changes the reflectance in the recording layer of the optical disc 12.

When reproducing data, the optical head 3 emits a low power laser beam, and the pickup 4 receives a reflection from the optical disc 12 to generate an electric signal corresponding to the intensity of the reflection. The read amplifier 5 amplifies the electric signal of the pickup 4 and provides the amplified electric signal to the data processor 6.

The data processor 6 functions as a decoder for demodulating the data read from the optical disc 12 and an encoder for modulating the data to be recorded on the optical disc 12. The DRAM 7 temporarily stores the reproduction data from the optical disc 12 and the data that is to be recorded on the optical disc 12.

In response to a reproducing command or a recording command from the host computer 11, the control microcomputer 8 controls the data processor 6 in accordance with a predetermined control program and controls the entire recording-reproducing device 1. In accordance with a request from the host computer 11, the control microcomputer 8 reads data from the optical disc 12, controls the transfer of data to the host computer 11, or controls the recording of data, which is transferred from the host computer 11, to the optical disc 12.

As shown in FIG. 1, the data processor 6 has circuits commonly used for a CD and a DVD. The commonly used circuits are a digital servo circuit 20, a read channel circuit 21, a master clock PLL circuit 22, a write clock PLL circuit 23, a memory interface 24, a host interface 25, an MCU interface 26, and a write strategy circuit 27. The data processor 6 has DVD exclusive circuits, which include an 8–16 demodulation circuit 31, an 8–16 modulation circuit 32, an error correction circuit 33, an LPP decoder 34, and a write timing generation circuit 35. Further, the data processor 6 has CD exclusive circuits, which include an EFM demodulation circuit 41, an EFM modulation circuit 42, an error correction circuit 43, an ATIP demodulation circuit 44, and a write timing generation circuit 45.

The data processor 6 is a single chip LSI circuit on which the CD/DVD common circuits, the DVD exclusive circuits, and the CD exclusive circuits are integrated on the same semiconductor substrate. The data processor 6 is connected to the DRAM 7 via the memory interface 24, to the host computer 11 via the host interface 25, and to the control microcomputer 8 via the MCU interface 26.

The read amplifier 5 amplifies electric signals, which include a radio frequency (RF) signal, a wobble signal, and an LPP signal, and provides the RF signal to the read channel circuit 21. The read channel circuit 21 is used commonly for a CD and a DVD to control data reproduction. Further, the read channel circuit 21 generates a read clock signal in accordance with the RF signal and provides the read clock signal to the digital servo circuit 20, the 8–16 demodulation circuit 31, the DVD error correction circuit 33, the EFM demodulation circuit 41, and the CD error correction circuit 43. The data processor 6 performs a series of data reproduction processes in synchronism with the read clock signal. The read channel circuit 21 samples the RF signal in accordance with the read clock signal and generates reproduced digital data having 14 bits or 16 bits in accordance with the subject of the read media. When the optical disc 12 is a DVD, the read channel circuit 21 provides the 8–16 demodulation circuit 31 with the read clock signal and digital data. When the optical disc 12 is a CD, the read channel circuit 21 provides the EFM demodulation circuit 41 with the read clock signal and the digital data.

The digital servo circuit 20 generates a control signal for the motor 2 with the RF signal and the read clock signal. In accordance with the control signal, focusing control for focusing a laser beam on the optical disc 12, tracking control for following the track of the optical disc 12 with the laser beam, and sled feed control for moving the optical head 3 in the radial direction of the optical disc 12 are performed.

The 8–16 demodulation circuit 31 demodulates the digital data provided by the read channel circuit 21 from 16-bit data to 8-bit data to generate demodulated data. The error correction circuit 33 performs error correction with an error correction code (ECC), error detection with an error detection code (EDC), and descrambling for the demodulated data. The decoded and descrambled data is transferred to the DRAM 7 via the memory interface 24.

The EFM demodulation circuit 41 demodulates the digital data provided by the read channel circuit 21 from 14-bit data to 8-bit data to generate demodulated data. The correction circuit 43 performs error correction with an error correction code (ECC), error detection with an error detection code (EDC), and descrambling for the demodulated data. The decoded and descrambled data is transferred to the DRAM 7 via the memory interface 24.

The EFM demodulation circuit 41 and the 8–16 demodulation circuit 31 are selectively controlled in accordance with the medium that is subject to reading. The control microcomputer 8 determines the type of the optical disc 12, which is set on the recording-reproducing device 1, from the reflectance of the light from the disc 12 to generate a disc distinguishing signal. The disc distinguishing signal is provided to each circuit to activate only the circuits that process the reading subject medium.

The master clock PLL circuit 22 generates a master clock signal at about 34 MHz by oscillating a crystal oscillator. The master clock signal is used as a system clock signal that controls the series of processes performed by the data processor 6.

The write clock PLL circuit 23 is commonly used for a CD and a DVD to control the recording of data. The write clock PLL circuit 23 receives the CD wobble signal, which is read from a CD, or a DVD wobble signal and LPP signal, which are read from a DVD, as position information, and uses the position information to generate a write clock signal. More specifically, the write clock PLL circuit 23 includes a selector 23a and a PLL circuit 23b. In accordance with the disc distinguishing signal, the selector 23a selects the CD wobble signal or the DVD wobble signal and the LPP signal and provides the selected signal to the PLL circuit 23b. The PLL circuit 23b generates a write clock signal from the selected signal. The write clock signal is provided to the LPP decoder 34, the DVD write timing generation circuit 35, the 8–16 modulation circuit 32, the ATIP demodulation circuit 44, the CD write timing generation circuit 45, the EFM modulation circuit 42, and the write strategy circuit 27. The data processor 6 performs the series of recording processes in synchronism with the write clock signal.

When the disc distinguishing signal indicates that the optical disc 12 is a DVD, the selector 23a selects the DVD wobble signal and LPP signal and provides the DVD wobble signal and LPP signal to the LPP decoder 34.

The LPP decoder 34 receives the DVD wobble signal and LPP signal from the write clock PLL circuit 23, extracts address information of the optical disc 12 from the received signals, and provides the address information to the write timing generation circuit 35. The write timing generation circuit 35 generates a timing signal, which determines the timing for writing data to the optical disc 12 based on the address information, and provides the timing signal to the 8–16 modulation circuit 32.

In accordance with the timing signal sent from the write timing generation circuit 35, the 8–16 modulation circuit 32 modulates the data transferred from the DRAM 7 via the memory interface 24 from 8-bit data to 16 bit-data to generate modulated data. The error correction circuit 33 performs the calculation of the error correction code (ECC), the addition of the ECC, the calculation of the error detection code (EDC), the addition of the EDC, and scrambling of the modulated data. The modulated and scrambled data is provided to the write strategy circuit 27 as recording data.

The ATIP demodulation circuit 44 detects the CD wobble signal amplified by the read amplifier 5, extracts ATIP data, which includes the address information of the optical disc 12, from the CD wobble signal, and provides the ATIP data to the write timing generation circuit 45. The write timing generation circuit 45 generates a timing signal, which determines the timing for writing data to the optical disc 12, from the ATIP data and provides the timing signal to the EFM modulation circuit 42.

In accordance with the timing signal sent from the write timing generation circuit 45, the EFM modulation circuit 42 modulates the data transferred from the DRAM 7 via the memory interface 24 from 8-bit data to 14 bit-data to generate modulated data. The error correction circuit 43 performs the calculation of the error correction code (ECC), the addition of the ECC, the calculation of the error detection code (EDC), the addition of the EDC, and scrambling of the modulated data. The modulated and scrambled data is provided to the write strategy circuit 27 as recording data.

The control microcomputer 8 determines the type of the medium subject to recording and provides a disc distinguishing signal, which is based on the determination, to the LPP decoder 34, the timing generation circuit 35, the 8–16 modulation circuit 32, the ATIP demodulation circuit 44, the timing generation circuit 45, and the EFM modulation circuit 42. These circuits are selectively activated in accordance with the disc distinguishing signal. That is, the disc distinguishing signal activates only circuits associated with the recording subject medium.

The write strategy circuit 27 includes a pulse control circuit 27a and a register 27b. Further, the write strategy circuit 27 converts modulated recording data to a pulse signal, in which the output intensity of the laser beam is adjusted, for accurate recording to the optical disc 12.

FIG. 3A illustrates a pulse signal, which is output from the write strategy circuit 27, when recording 5T ("T" being the bit width of a single channel) of data. FIG. 3B illustrates the pulse signal when the optical disc 12 is a DVD-R. FIG. 3C illustrates the pulse signal when the optical disc 12 is a DVD-RW or a CD-RW. FIG. 3D illustrates the pulse signal when the optical disc 12 is a CD-R. As shown in FIGS. 3B to 3D, the pulse signal is generated so that the intensity of the laser beam is first strong and then becomes rather weak. This is because if the laser beam irradiates the recording layer of the optical disc 12 at a constant intensity when recording data, the temperature at the irradiation initiation position increases from a low state. Thus, the formation of pits is insufficient at the irradiation initiation position, and the formation of pits is inaccurate since the temperature easily increases at positions close to positions having high temperatures. Accordingly, the intensity of the laser beam is first strong and then becomes rather weak to accurately form recording pits in accordance with the recording data. Further, the data writing temperature and the temperature increasing rate differs between different types of the optical disc 12. Thus, a pulse wave corresponding to the type of optical disc 12 is generated as shown in FIGS. 3B to 3D. In FIGS. 3B and 3C, the intensity of the laser beam is adjusted by a multi-pulse waveform, and in FIG. 3D, the intensity of the laser beams is adjusted by changing the voltage of the pulse.

Referring to FIG. 3B, for a DVD-R, the pulse width of the first pulse signal is regulated by a first parameter Pa1. The pulse width of the pulse signals following the first pulse signal is regulated by a second parameter Pa2. Referring to FIG. 3C, for a DVD-RW or a CD-RW, the pulse width of the first pulse signal is regulated by a first parameter Pb1. The pulse width of the pulse signals following the first pulse signal is regulated by a second parameter Pb2. Referring to FIG. 3D, for a CD-R, the rising edge position of the pulse signal is regulated by a first parameter Pc1, and the pulse width corresponding to the high voltage of the pulse signal is regulated by a second parameter Pc2.

The parameters are set in accordance with the data length of the recording data. In the preferred embodiment, an incorporated memory (not shown) of the control microcomputer 8 stores tables of data, which include the parameters set in accordance with the types of recording medium. The control microcomputer 8 determines the type of optical disc 12 set on the recording-reproducing device 1, reads the data table corresponding to the disc type, and transfers the read data table to the register 27b of the write strategy circuit 27. The pulse control circuit 27a extracts the parameters corresponding to the recording medium from the data table in the register 27b, performs a calculation to generate a pulse from the parameter, and generates a pulse signal based on the calculation. A laser driver (not shown) drives an optical head 3 in accordance with the pulse signal to output a laser beam and form recording pits corresponding to the recording data on the optical disc 12.

The data processor 6 of the preferred embodiments has the advantages described below.

(1) The data processor 6 is a single chip LSI provided with the functions of a decoder and an encoder and includes the write strategy circuit 27, which is commonly used for a CD and a DVD. Accordingly, in comparison with when providing separate write strategy circuits for a CD and a DVD, the circuit area of the data processor 6 is decreased.

(2) The data processor 6 includes the read channel circuit 21, which is used commonly for a CD and a DVD. Thus, in comparison when providing separate read channel circuits for a CD and a DVD, the circuit area of the data processor 6 is decreased.

(3) The register 27b of the write strategy circuit 27 stores parameters corresponding to the type of the optical disc 12. The pulse control circuit 27a generates a pulse signal in accordance with the recording data with the parameters stored in the register 27b. Accordingly, an accurate signal corresponding to the type of optical disc 12 is generated.

(4) The data processor 6 includes the master clock PLL circuit 22, the write clock PLL circuit 23, the memory interface 24, the host interface 25, and the MCU interface 26, which are used commonly for a CD and a DVD. Accordingly, the circuit area of the data processor 6 is effectively decreased. Further, the miniaturization of the data processor 6 reduces the manufacturing cost of the data processor 6.

(5) The read channel circuit 21, the write clock PLL circuit 23, and the write strategy circuit 27 are used since they do not affect the functions of the data processor 6 in an undesirable manner even if they are used for both a CD and a DVD. In other words, by using the three circuits 21, 23, 27 for both a CD and a DVD, the circuit area of the data processor 6 is reduced without affecting the data processor 6 in an undesirable manner.

It should be apparent to those skilled in the art that the present invention may be embodied in many other specific forms without departing from the spirit or scope of the invention. Particularly, it should be understood that the present invention may be embodied in the following forms.

Among the read channel circuit 21, the write clock PLL circuit 23, and the write strategy circuit 27, the read channel circuit 21 and the write clock PLL circuit 23 or the read channel circuit 21 and the write strategy circuit 27 may be used commonly for a CD and a DVD.

In addition to the read channel circuit 21, the write clock PLL circuit 23, and the write strategy circuit 27, the error correction circuits 33 and 43 or the write timing generation circuits 34 and 45 may be used commonly for a CD and a DVD. For example, in the error correction circuits 33 and 43, some logic circuits, such as a multiplier or an adder, may be used commonly for a CD and a DVD.

The present examples and embodiments are to be considered as illustrative and not restrictive, and the invention is not to be limited to the details given herein, but may be modified within the scope and equivalence of the appended claims.

What is claimed is:

1. A data processor compatible for use with a first optical disc recording medium and a second optical disc recording medium, wherein the first optical disc recording medium records first position information corresponding to a first recording format, and the second optical disc recording medium records second position information corresponding to a second recording format, the data processor comprising:
   a first timing generation circuit which generates a first timing signal based on first position information read from the first optical disc recording medium;
   a second timing generation circuit which generates a second timing signal based on second position information read from the second optical disc recording medium;
   a first modulation circuit connected to the first timing generation circuit which performs a first modulation process on recording data for recording on the first optical disc recording medium in accordance with the first timing signal and generates first modulated data;
   a second modulation circuit connected to the second timing generation circuit which performs a second modulation process on the recording data for recording on the second optical disc recording medium in accordance with the second timing signal and generates second modulated data; and
   a write strategy circuit connected to the first and second modulation circuits which generates a first write signal, which is written to the first optical disc recording medium, from the first modulated data, and a second write signal, which is written to the second optical disc recording medium, from the second modulated data.

2. The data processor according to claim 1, wherein the first optical disc recording medium is a CD, and the second optical disc recording medium is a DVD.

3. The data processor according to claim 1, wherein the first and second modulation circuits are selectively activated in response to a distinguishing signal indicating the type of optical disc recording medium.

4. The data processor according to claim 1, wherein the write strategy circuit includes:
   a register for storing one of a first data table corresponding to the first optical disc recording medium, and a second data table corresponding to the second optical disc recording medium; and
   a pulse generation circuit connected to the register to generate from the data table stored in the register one of a first pulse signal corresponding to the first write signal, and a second pulse signal corresponding to the second write signal.

5. The data processor according to claim 1, further comprising a write clock generation circuit for generating a write clock signal for controlling the write strategy circuit, wherein the write clock generation circuit includes a selector which selects one of the first position information and the second position information in accordance with a distinguishing signal indicating the type of the optical disc recording medium.

6. The data processor according to claim 1, further comprising:
   a read channel circuit which generates first reproduced data based on a first read signal from the first optical disc recording medium and generates second reproduced data based on a second read signal from the second optical disc recording medium;
   a first demodulation circuit connected to the read channel circuit which performs a first demodulation on the first reproduced data and generates first demodulated data; and
   a second demodulation circuit connected to the read channel circuit which performs a second demodulation on the second reproduced data and generates second demodulated data.

7. The data processor according to claim 6, wherein the read channel circuit generates a read clock signal from one of the first read signal and the second read signal, the first demodulation circuit generates the first demodulated data in accordance with the read clock signal, and the second demodulation circuit generates the second demodulated data in accordance with the read clock signal.

8. The data processor according to claim 6, wherein the first and second demodulation circuits are selectively operated in response to a distinguishing signal indicating the type of the optical disc recording medium.

9. A data processor compatible for use with a first optical disc recording medium and a second optical disc recording medium, wherein the first optical disc recording medium records first position information corresponding to a first recording format, and the second optical disc recording medium records second position information corresponding to a second recording format, the data processor comprising:
   a first timing generation circuit which generates a first timing signal based on first position information read from the first optical disc recording medium;
   a second timing generation circuit which generates a second timing signal based on second position information read from the second optical disc recording medium;
   a first modulation circuit connected to the first timing generation circuit which performs a first modulation process on recording data for recording on the first optical disc recording medium in accordance with the first timing signal and generates first modulated data;
   a second modulation circuit connected to the second timing generation circuit which performs a second modulation process on the recording data for recording on the second optical disc recording medium in accordance with the second timing signal and generates second modulated data, wherein the first and second modulation circuits are selectively activated in response to a distinguishing signal indicating the type of optical disc recording medium; and
   a write signal generation circuit connected to the first and second modulation circuits which generates a first write signal, which is written to the first optical disc recording medium, from the first modulated data, and a second write signal, which is written to the second optical disc recording medium, from the second modulated data, wherein the write signal generation circuit includes,
      a register for storing one of a first data table corresponding to the first optical disc recording medium, and a second data table corresponding to the second optical disc recording medium, and
      a pulse generation circuit connected to the register which generates from data of the data table stored in the register one of a first pulse signal corresponding to the first write signal, and a second pulse signal corresponding to the second write signal.

10. The data processor according to claim 9, wherein the first optical disc recording medium is a CD, and the second optical disc recording medium is a DVD.

11. A data processor compatible for use with a first optical disc recording medium and a second optical disc recording medium, wherein the first optical disc recording medium records first position information corresponding to a first recording format, and the second optical disc recording medium records second position information corresponding to a second recording format, the data processor comprising:
- a first timing generation circuit which generates a first timing signal based on first position information read from the first optical disc recording medium;
- a second timing generation circuit which generates a second timing signal based on second position information read from the second optical disc recording medium;
- a first modulation circuit connected to the first timing generation circuit which performs a first modulation process on recording data for recording on the first optical disc recording medium in accordance with the first timing signal and generates first modulated data;
- a second modulation circuit connected to the second timing generation circuit which performs a second modulation process on the recording data for recording on the second optical disc recording medium in accordance with the second timing signal and generates second modulated data, wherein the first and second modulation circuits are selectively activated in response to a distinguishing signal indicating the type of optical disc recording medium;
- a write signal generation circuit connected to the first and second modulation circuits which generates a first write signal, which is written to the first optical disc recording medium, from the first modulated data, and a second write signal, which is written to the second optical disc recording medium, from the second modulated data, wherein the write signal generation circuit includes,
  - a register for storing one of a first data table corresponding to the first optical disc recording medium, and a second data table corresponding to the second optical disc recording medium, and
  - a pulse generation circuit connected to the register which generates from data of the data table stored in the register one of a first pulse signal corresponding to the first write signal, and a second pulse signal corresponding to the second write signal;
- a read channel circuit which generates first reproduced data based on a first read signal from the first optical disc recording medium and generates second reproduced data based on a second read signal from the second optical disc recording medium;
- a first demodulation circuit connected to the read channel circuit which performs a first demodulation on the first reproduced data and generates first demodulated data; and
- a second demodulation circuit connected to the read channel circuit which performs a second demodulation on the second reproduced data and generates second demodulated data, wherein the read channel circuit generates a read clock signal from one of the first read signal and the second read signal, the first demodulation circuit generates the first demodulated data in accordance with the read clock signal, and the second demodulation circuit generates the second demodulated data in accordance with the read clock signal.

12. The data processor according to claim 11, wherein the first optical disc recording medium is a CD, and the second optical disc recording medium is a DVD.

* * * * *